United States Patent
Kim et al.

(10) Patent No.: US 8,447,885 B2
(45) Date of Patent: May 21, 2013

(54) USER TERMINAL SYSTEM, DIGITAL RIGHTS MANAGEMENT SYSTEM INCLUDING THE USER TERMINAL SYSTEM, AND METHOD OF MANAGING DIGITAL RIGHTS

(75) Inventors: Sin Hyo Kim, Daejeon (KR); Byung Ho Chung, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 436 days.

(21) Appl. No.: 12/878,313

(22) Filed: Sep. 9, 2010

(65) Prior Publication Data
US 2011/0072159 A1 Mar. 24, 2011

(30) Foreign Application Priority Data
Sep. 21, 2009 (KR) ........................ 10-2009-0089106

(51) Int. Cl.
*G06F 15/16* (2006.01)
(52) U.S. Cl.
USPC ........... 709/246; 709/203; 709/224; 709/225; 709/229
(58) Field of Classification Search
USPC ........................ 709/203, 221, 225, 229, 246
See application file for complete search history.

(56) References Cited

U.S. PATENT DOCUMENTS

| | | | |
|---|---|---|---|
| 2004/0030651 A1 | 2/2004 | Kim et al. | |
| 2005/0246643 A1* | 11/2005 | Gusmorino et al. | 715/734 |
| 2006/0036568 A1* | 2/2006 | Moore et al. | 707/1 |
| 2006/0149961 A1 | 7/2006 | Park et al. | |
| 2011/0072159 A1* | 3/2011 | Kim et al. | 709/246 |

FOREIGN PATENT DOCUMENTS

| | | |
|---|---|---|
| KR | 10-2004-0013726 A | 2/2004 |
| KR | 1020060049669 A | 5/2006 |
| KR | 10-2006-0080729 A | 7/2006 |
| KR | 10-2007-0109565 | 11/2007 |
| KR | 10-2008-0004098 A | 1/2008 |
| KR | 1020090007963 A | 1/2009 |
| KR | 1020090044438 A | 5/2009 |

* cited by examiner

*Primary Examiner* — Michael Won

(57) ABSTRACT

Provided is a digital rights management system, in which a process of combining digital content created by the original author with first metadata indicated with rights information of the original author and a process of combining revised digital content with second metadata indicated with rights information of a secondary author, are respectively and separately performed at the server and terminal sides. Thus, the digital rights management system can reduce the load generated at the server side compared to a system in which the server side performs both of the above processes.

15 Claims, 5 Drawing Sheets

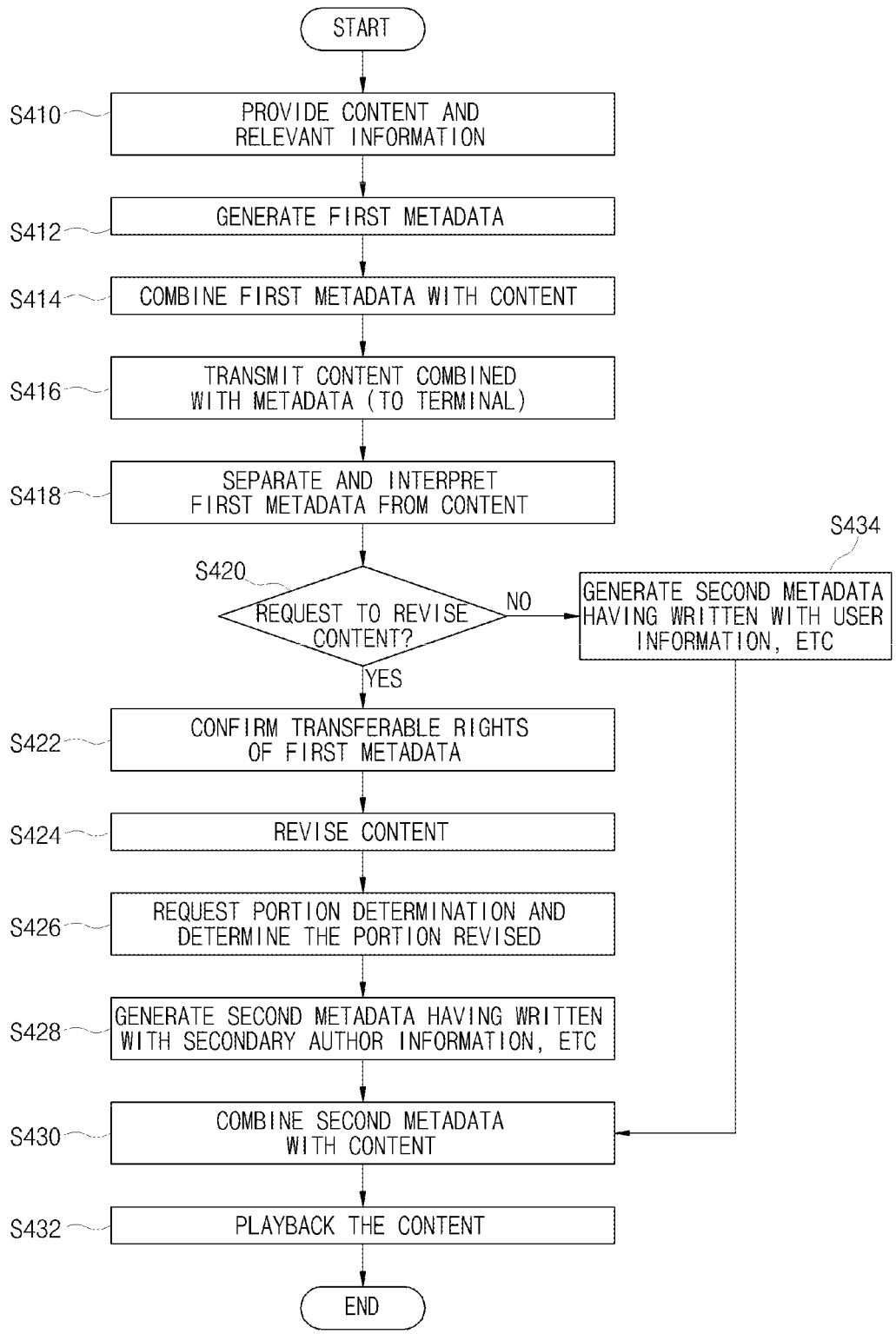

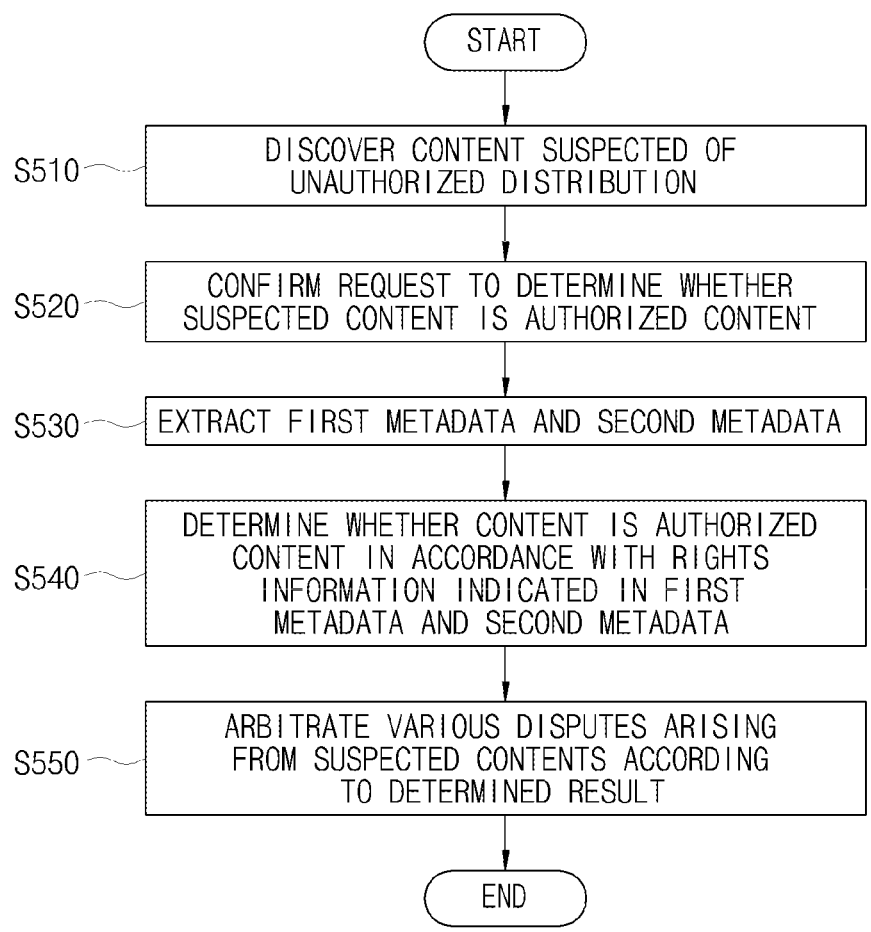

USER TERMINAL SYSTEM, DIGITAL RIGHTS MANAGEMENT SYSTEM INCLUDING THE USER TERMINAL SYSTEM, AND METHOD OF MANAGING DIGITAL RIGHTS

CROSS-REFERENCE TO RELATED APPLICATION

This application claims priority from Korean Patent Application No. 10-2009-0089106 filed on Sep. 21, 2009, in the Korean Intellectual Property Office, the disclosure of which is incorporated herein by reference in its entirety.

FIELD OF THE INVENTION

The following disclosure relates to a digital rights management system and a method of managing digital rights, and more particularly, to a digital rights management system and a method of managing digital rights which can protect the rights of the original author of content and a secondary author who modifies or processes the content.

BACKGROUND

Recently, processing and distributing multimedia content created by other people into a new form through high speed Internet environment is becoming prevalent. However, the digital rights management (DRM) system for protecting the rights of the original author overly restricts the processing and reusing of digital content into various other formats by end users. Such a DRM system does not consider contributions made by secondary authors in modifying the content created by the original author. This obstructs potential contributions to be made by secondary authors and distribution activities of the content created by the original author.

Although, conventional DRM systems provide functions for protecting copyrights of a service provider (or a content provider), but they do not provide a function for protecting the copyright of general users who subsequently modified the contents created by the original author. Namely, conventional DRM systems do not provide a method of providing transferable rights (rights transferred from the original author which can be used within the scope of the rights of the original author by secondary authors), or a method of indicating the rights to the portion of content modified and contributed by secondary authors.

Also, conventional DRM systems send rights information separate from the content to user terminals. However, they do not provide a method which can prevent the rights information from being changed. That is, if digital content with removed rights information is distributed, it is almost impossible to trace the digital content. Although, DRM systems provide some security measures in that metadata having indicated with information related to encrypted digital content is provided, there are no particular security measures provided at the terminal environment where digital content is played.

SUMMARY OF THE INVENTION

In one general aspect, a user terminal system includes: a metadata interpreter receiving first digital content transmitted from a server, separating first metadata from the first digital content, and interpreting identification information of original author, transferable rights, and revision permitting conditions indicated in the separated first metadata for the first digital content; a content revising unit revising the first digital content in accordance with the interpreted revision permitting conditions in response to a request from a secondary author; a metadata generator receiving portion ratio information transmitted from the server, the portion ratio information indicating a portion ratio of a portion revised by the secondary author and a remaining original portion created by the original author in the first digital content, and combining the portion ratio information and identification information of the secondary author received from the content revising unit with the first metadata to generate second metadata; and a metadata combiner combining the revised first digital content with the second metadata, and generating second digital content having indicated with the portion ratio of the original author and the secondary author.

In another general aspect, a digital rights management system includes: a service provider system creating first digital content which includes first metadata having indicated with identification information of original author, transferable rights and revision permitting conditions; and a user terminal system receiving the first digital content through wired or wireless networks, revising the first digital content in accordance with the revision permitting conditions indicated in the first metadata, receiving from the service provider system identification information of a secondary author who has made a request to revise the first digital content and portion ratio information indicating a portion ratio of a portion revised by the secondary author and a remaining original portion created by the original author in the first digital content, generating second metadata by combining the received portion ratio information with the first metadata, and generating the second digital content by combining the generated second metadata with the revised first digital content.

In another general aspect, a method of managing digital rights includes: receiving first digital content including first metadata written with identification information of original author, transferable rights and revision permitting conditions from a server; revising the first digital content in accordance with the revision permitting conditions indicated in the first metadata; generating second metadata by writing on the first metadata identification information of a secondary author who has made a request to revise the first digital content and portion ratio information indicating a portion ratio of a portion revised by the secondary author and a remaining original portion created by the original author in the first digital content; and generating second digital content having indicated with the portion ratio of the original author and the secondary author by combining the revised first digital content with the generated second metadata.

Other features and aspects will be apparent from the following detailed description, the drawings, and the claims.

BRIEF DESCRIPTION OF THE DRAWINGS

FIG. 4 is a flowchart illustrating a service process provided by the digital rights management system shown in FIG. 1.

FIG. 5 is a flowchart illustrating a process of tracing unauthorized distribution of contents by a content tracer shown in FIG. 1.

DETAILED DESCRIPTION OF THE EXEMPLARY EMBODIMENTS

Figure 1:
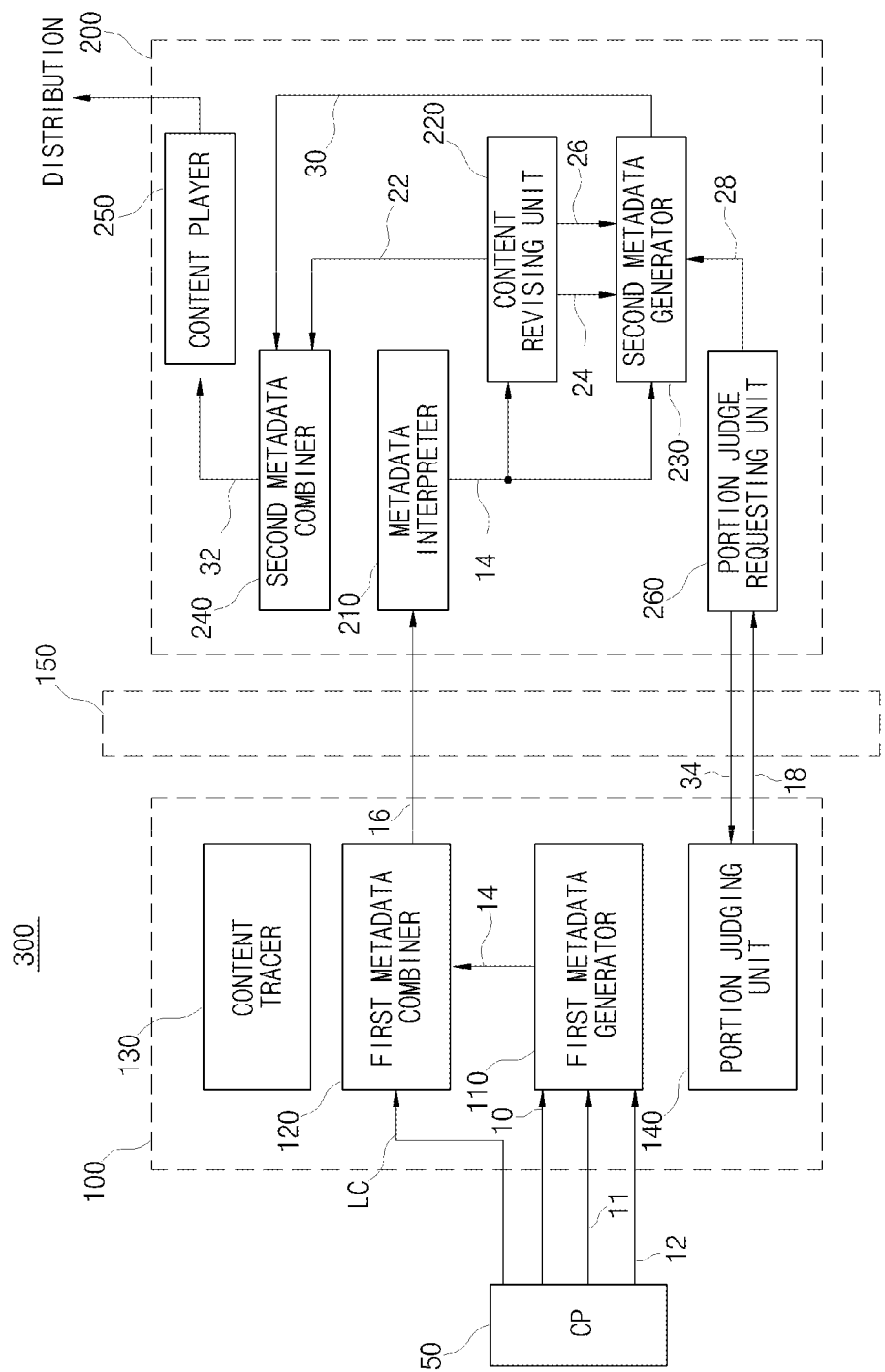
FIG. 1 is a bock diagram of a digital rights management system according to an exemplary embodiment.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to the secondary author of ordinary skill in the art. Also, descriptions of well-known functions and constructions may be omitted for increased clarity and conciseness.

The digital rights management system according to an exemplary embodiment combines identification information of original author as well as identification information of a secondary author who revised digital content created by the original author and portion ratio of the secondary author to metadata which is used to indicate the copyright information of the digital content. Therefore, it protects the rights of the original author of the digital content as well as the rights of the secondary author. That is, a digital rights management system 300 according to an exemplary embodiment makes it possible to indicate in first metadata, along with the rights of the original author, revision permitting conditions that control whether a revision of the digital content can be carried out to some extent. Simultaneously, the digital rights management system 300 according to an exemplary embodiment also makes it possible to indicate in second metadata the rights of the secondary author (with respect to a portion revised by the secondary author) and device information indicating which terminal has played back or revised the digital content.

Additionally, in the digital rights management system according to an exemplary embodiment, if unauthorized distribution of content is discovered, a service provider analyzes content suspicious of unauthorized distribution, and then analyzes user information (information of the original author, information of secondary author or information of user who downloaded and played back the content) and the rights information indicated in the first and the second metadata. The analyzed result can be used to trace unauthorized distributors. That is, the first and the second metadata can be used to settle a variety of copyright disputes that may arise from the content suspicious of unauthorized distribution.

Hereinafter, exemplary embodiments will be described in detail with reference to the accompanying drawings.

Figure 2:
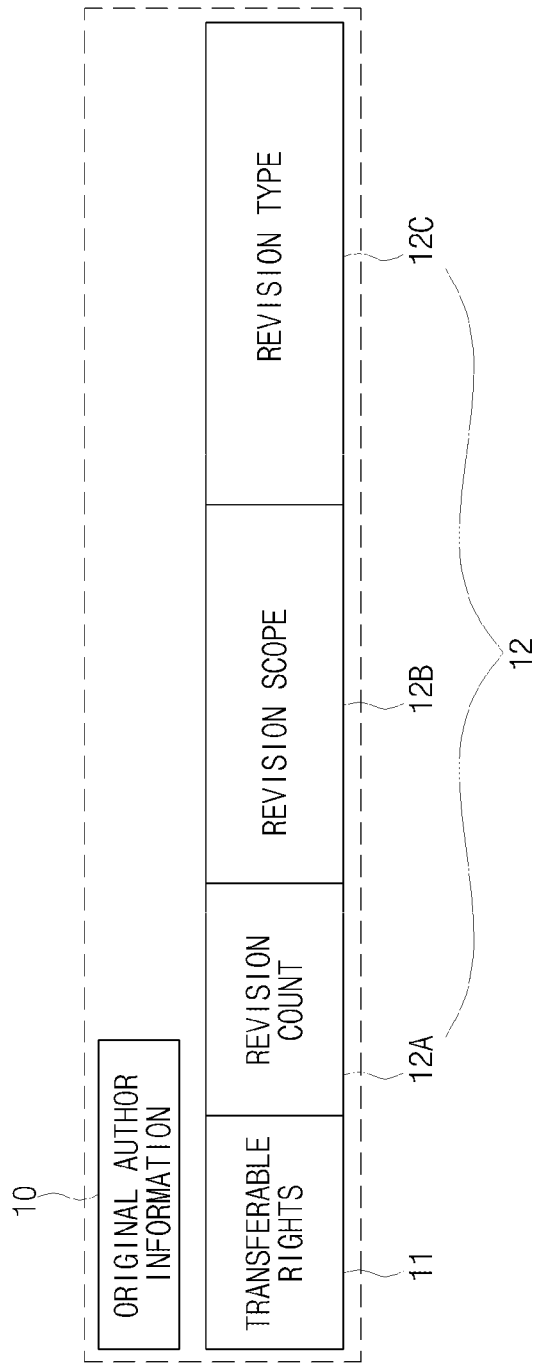
FIG. 2 is a diagram illustrating information written in first metadata generated by a first metadata generator shown in FIG. 1.
Figure 3:
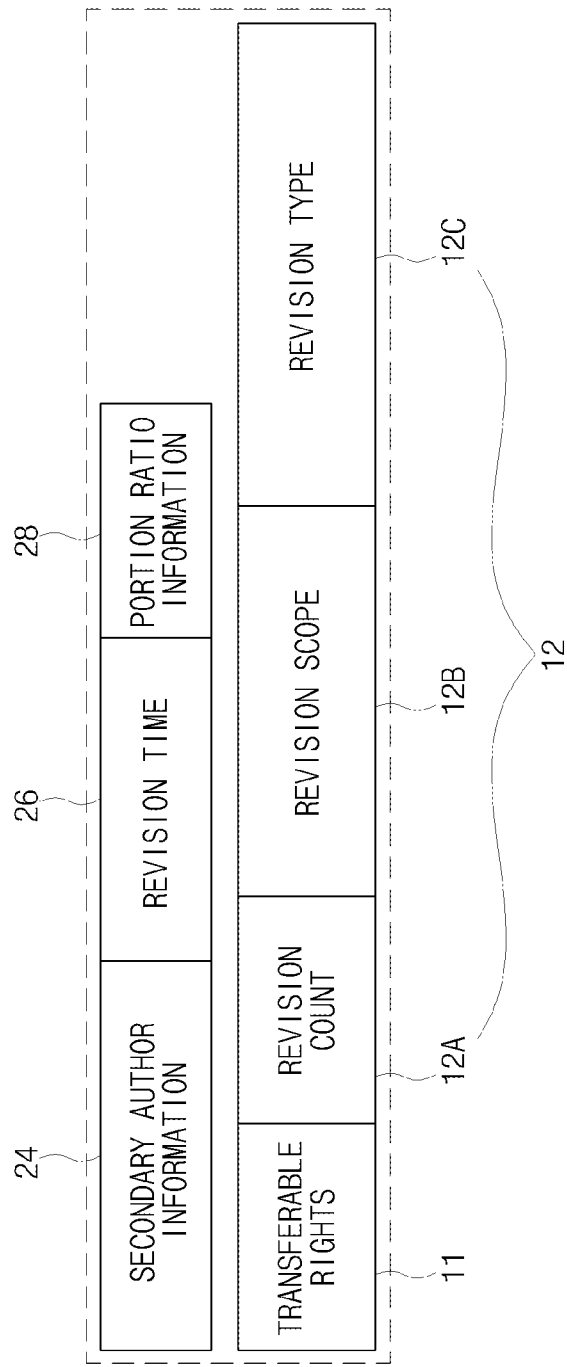
FIG. 3 is a diagram illustrating information written in second metadata generated by a second metadata generator shown in FIG. 1.

FIG. 1 is a bock diagram of a digital rights management system according to an exemplary embodiment. FIG. 2 shows information written in first metadata generated by a first metadata generator shown in FIG. 1. FIG. 3 is a diagram illustrating information written in second metadata generated by a second metadata generator shown in FIG. 1.

Referring to FIG. 1, the digital rights management system 300 according to an exemplary embodiment includes a service provider system 100 and a user terminal system 200. The service provider system 100 performs a process of combining first digital content with first metadata including rights information of the original author (or rights to a portion created by the original author). The user terminal system 200 performs a process of combining second digital content with second metadata including rights information of a secondary author (or rights to a portion revised by the secondary author). The rights information indicated in the second metadata includes the rights information indicated in the first metadata. The user terminal system 200 finally plays back the second digital content having indicated in a metadata form a portion ratio of the original author and the secondary author.

Hereinafter, the digital rights management system 300 will be described in detail. The service provider system 100 will first be described, followed by the user terminal system 200 in detail.

The service provider system 100 includes a first metadata generator 110, a first metadata combiner 120, a content tracer 130 and a portion judging unit 140.

The first metadata generator 110 receives rights information related to raw contents from a content provider (CP) 50, and generates first metadata 14 including relevant rights information. For example, the content provider 50 may be a professional content manufacturer or personal user created contents (UCC) manufacturer, such as a film company and a TV production company and so forth. The rights information includes original author information of raw content 10, transferable rights 11, and revision permitting conditions 12. The revision permitting conditions 12 includes a revision count 12A which is a number of revisions allowed, a revision scope 12B, and a permissible revision type 12C. The revision scope 12B defines whether all or some contents of the first digital content can be revised. The permissible revision type 12C is information that indicates the types of revisions that can be made. For example, the permissible revision type may be copying, modifying, and inserting characters, etc. The type of first digital content 16 is not limited to films, music, pictures, and games, etc.

The first metadata combiner 120 combines the raw contents from the content provider 50 with the first metadata 14 from the first metadata generator 110 in accordance with a digital watermarking method, and generates the first digital content 16. The first digital content 16 including the first metadata 14 is sent to the user terminal system 200 through wired or wireless networks.

The content tracer 130 traces an unauthorized distributor (or a user terminal system) by analyzing digital content 34 suspected of unauthorized distribution in the case that the user terminal system 200 is engaged in unauthorized distribution of the first digital content 16 transmitted from the service provider system 100 or performs unauthorized revision of the first digital content 16 and distributes the revised first digital content 16. Namely, the content tracer 130 traces an unauthorized distributor (or a user terminal system) by analyzing identification information of original author 10, identification information of secondary author 24, and many kinds of rights information (reference numerals 10, 11, 12, 24, 26, and 28 of FIG. 3) of the second metadata corresponding to the digital content suspected of unauthorized distribution. Like this, the information indicated in second metadata 30 combined with the digital content can be used to resolve copyright disputes between users. Hereinbelow, the detailed description of the second metadata 30 will be given below.

In the case that the user terminal system 200 revises the first digital content 16 in accordance with a user request, the portion judging unit 140 receives a portion judge request message with respect to a portion revised from the user terminal system 200, determines a portion revised in response to the portion judge request message, and sends portion ratio information 18 with respect to the portion revised to a portion judge requesting unit 260 of the user terminal system 200.

Meanwhile, the tracing function of the digital content suspected of unauthorized distribution performed in both the content tracer 130 and the portion judging unit 140 and the function of determining the portion revised by the secondary author may be performed in other reliable systems. In this case, the content tracer 130 and the portion judging unit 140 may be excluded from the layout of the service provider system 100.

Hereinafter, the user terminal system 200 will be described in detail.

The user terminal system 200 includes a metadata interpreter 210, a content revising unit 220, a second metadata generator 230, a second metadata combiner 240, a content player 250, and a portion judge requesting unit 260.

The metadata interpreter 210 receives the first digital content 16 having inserted with the first metadata MT1 from the service provider system 100, separates the first metadata from the first digital content 16, and interprets the separated first metadata.

The content revising unit 220 revises the first digital content in accordance with the result of interpretation carried out by the metadata interpreter 210. That is, the content revising unit 220 confirms transferable rights written in the first metadata 14 in the case of permitting the transfer of rights, and revises the first digital content 16 in accordance with revision permitting conditions such as a revision count which indicates the number of revisions allowed, a revision scope and a revision type. A revision which does not satisfy the permitting conditions, is not allowed to revise the first digital content. Content 22 revised in accordance with the revision permitting conditions is transmitted to the second metadata combiner 240.

The second metadata generator 230 is inputted with the identification information of the secondary author 24 (or a device information of the user terminal system), time information of time consumed to revise the first digital content 26 from the content revising unit 220, in addition to the portion ratio information 28 provided from the portion judging unit 260. The second metadata generator 230 combines above information 24, 26, and 28 with the first metadata 14 separated from the first digital content 16, and generates the second metadata 30 as shown in FIG. 3. The generated second metadata 30 is transmitted to the metadata combiner 240. In case of revising or distributing the first digital content 16 without authorization, information 24, 26, and 28 written in the second metadata 30 as above can be used as useful data information to track the user terminal system of a secondary author who has carried out unauthorized distribution.

The second metadata combiner 240 combines the second metadata 30 provided from the second metadata generator 230 with the content 22 revised by the content revising unit 220 in accordance with a digital watermarking method. The second metadata 30 being inserted to the revised content 22 is transmitted to the content player 250 as the second digital data.

The content player 250 plays back the second digital content 32 having inserted with the second metadata 30 in accordance with a playback request made by end user. The content player 250 includes a media player which is able to playback the second digital content. Examples of the media player are a digital TV, a portable multimedia player (PMP), a mobile phone, a PDA, and an MP3 player.

The portion judge requesting unit 260 sends the portion judge request message 34 to the portion judging unit 140 of the service provider system 100 after revising the first digital content 16 by the content revising unit 220. In response to the portion judge request message 34, the portion judging unit 140 approves that the a portion of the first digital content 16 was revised, and sends the portion ratio information 18 corresponding to the approved portion to the portion judge requesting unit 260. The portion ratio information 18 transmitted from the portion judging unit 140 is transmitted to the second metadata generator 230 through the portion judge requesting unit 260, and is written in the second metadata 30.

FIG. 4 is a flowchart illustrating a service process provided by a digital rights management system shown in FIG. 1.

Referring to FIGS. 1 and 4, the content provider 50 provides the rights information including the revision permitting condition 12 and the raw content to the service provider system, operation S410.

The first metadata 14 having written with the transferable rights, revising count, and revising scope is generated by the first metadata generator 110, operation S412.

The first metadata 14 is inserted into raw content (RC) by the first metadata combiner 120, operation S414. The first metadata 14 inserted into the raw content is transmitted to the user terminal system 200 as the first digital content 16, operation S416.

The user terminal system 100 separates the first metadata 14 from the first digital content 16, and interprets the separated first metadata, operation S418.

A user judges whether a revision request of the first digital content 16 has been made, operation S420.

If there is a revision request, the transferable rights as the rights permitting revision written in the first metadata 14 is confirmed by the metadata interpreter 210, operation S422.

If the rights permitting revision is confirmed, the revision of the first digital content based on the rights permitting revision written in the first metadata is performed by the content revising unit 220, operation S424. As a result, the second digital data 22 is generated.

When a user of the user terminal system 200 requests judging of a portion revised in the first digital content to be made, the portion judge request message 34 is transmitted to the portion judging unit 140 of the service provider system 100 by the portion judge requesting unit 260. The portion judging unit 140 determines a portion revised in response to the portion judge request message 34, and sends portion ratio information corresponding to the determined portion to the portion judge requesting unit 260, operation S426.

The second metadata 30 having written with the portion ratio information received from the service provider system 100, the revision time of the first digital data, and the identification information of the secondary author (or a device of the user terminal system) is generated.

The generated second metadata 30 is inserted into the second digital data 22 by the second metadata combiner 240, operation S430.

The second digital data 22 having inserted with the second metadata 30 is played back and distributed by the content player 250, operation S432.

Meanwhile, in the case a request to revise the first digital data has not been made by a user, that is, in the case the user only wants to play back the first digital content without revising the first digital data, second metadata having written with the identification information of the user and the playback time is generated by the second metadata generator 220. In the case of having unauthorized distribution of the first digital content, the service provider system is able to trace the user or terminal device responsible for the unauthorized distribution through the identification information of the user written in the second metadata.

FIG. 5 is a flowchart illustrating a process of tracing unauthorized distribution of contents by a content tracer shown in FIG. 1.

Referring to FIG. 5, the content provider discovers content suspected of unauthorized distribution or use without permission, operation S510. The content provider transmits an inquiry message to confirm whether the suspected content is authorized content, operation S520. The service provider system having received the confirm request receives the suspected content, and extracts the first metadata and the second metadata from the received content, operation S530. The service provider system determines whether the suspected content is authorized content by analyzing the rights information (for example, transferable rights, revision permitting conditions, revision time, portion ratio information, etc.) written in the extracted first and second metadata, operation S540. Based on the determined result, various types of disputes arising from the suspected contents are arbitrated, operation S550.

As described above, according to exemplary embodiments, the copyrights of both the original author and the secondary author who revised the original content can be protected by respectively indicating the portions of the revised digital content that belong to the original author and to the secondary author in the metadata of the revised digital content.

Also, since the identification information of the original author and the identification information of the secondary author are indicated in the metadata of the revised digital content, any unauthorized distribution of the revised digital content can be traced to the person (or the user terminal) responsible for the unauthorized distribution. In addition, copyright disputes between users can be settled to increase the distribution of the digital content.

Also, since the process of combining the digital content created by the original author with the first metadata having indicated with the rights information of the original author and the process of combining the revised digital content with the second metadata having indicated with the rights information of the secondary author, are respectively and separately performed at the server and terminal sides, the digital rights management system can reduce the load generated at the server side compared to a system in which the server side performs both of the above processes.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A user terminal system comprising:
a metadata interpreter receiving first digital content transmitted from a server, separating first metadata from the first digital content, and interpreting identification information of original author, transferable rights, and revision permitting conditions indicated in the separated first metadata for the first digital content;
a content revising unit revising the first digital content in accordance with the interpreted revision permitting conditions in response to a request from a secondary author;
a metadata generator receiving portion ratio information transmitted from the server, the portion ratio information indicating a portion ratio of a portion revised by the secondary author and a remaining original portion created by the original author in the first digital content, and combining the portion ratio information and identification information of the secondary author received from the content revising unit with the first metadata to generate second metadata; and
a metadata combiner combining the revised first digital content with the second metadata, and generating second digital content having indicated with the portion ratio of the original author and the secondary author.

2. The user terminal system of claim 1, wherein the metadata interpreter interprets revision count information, revision scope information and revision type information as the revision permitting conditions.

3. The user terminal system of claim 1, wherein the metadata generator receives time information of time consumed to revise the first digital content from the content revising unit, combines the time information with the first metadata, and generates the second metadata.

4. The user terminal system of claim 1, further comprising a portion judge requesting unit sending a portion judge request message with respect to the portion revised by the secondary author, receiving the portion ratio information as a response message to the share judge request message from the server, and transmitting the portion ratio information to the metadata generator.

5. The user terminal system of claim 1, further comprising: a content playback unit comprising a media player playing back the second digital content, wherein the media player is one among a digital TV, a portable multimedia player (PMP), a mobile phone, a PDA, and an MP3 player.

6. The user terminal system of claim 5, wherein the content playback unit comprises a media player playing back the second digital content, in which the media player includes a digital TV, a portable multimedia player (PMP), a mobile phone, a PDA, and an MP3 player.

7. A digital rights management system comprising:
a service provider system creating first digital content which includes first metadata having indicated with identification information of original author, transferable rights and revision permitting conditions; and
a user terminal system receiving the first digital content through wired or wireless networks, revising the first digital content in accordance with the revision permitting conditions indicated in the first metadata, receiving from the service provider system identification information of a secondary author who has made a request to revise the first digital content and portion ratio information indicating a portion ratio of a portion revised by the secondary author and a remaining original portion created by the original author in the first digital content, generating second metadata by combining the received portion ratio information with the first metadata, and generating the second digital content by combining the generated second metadata with the revised first digital content.

8. The digital rights management system of claim 7, wherein the user terminal system transmits a portion judge request message with respect the portion revised by the secondary author to the service provider system.

9. The digital rights management system of claim 8, wherein the service provider system comprises:
a first metadata generator generating the first metadata written with the identification information of original author, the transferable rights and the revision permitting conditions provided by a content provider;
a first metadata combiner generating the first digital content by combining a raw content provided from the content provider with the generated first metadata; and
a portion judging unit responding the portion judge request message by transmitting the portion ratio information to the user terminal system.

10. The digital rights management system of claim 9, wherein the first metadata generator interprets revision count information, revision scope information, and revision type information as the revision permitting conditions.

11. The digital rights management system of claim 9, wherein the service provider system further comprises a content tracer which traces the user terminal system for unauthorized distribution of the second digital content by using the identification information of original author, the identification information of the secondary author, and the portion ratio information written in the second metadata.

12. The digital rights management system of claim 9, wherein the user terminal system comprises:
   a metadata interpreter receiving the first digital content transmitted from the service provider, and interpreting the identification information of original author, the transferable rights, and the revision permitting conditions written in the first metadata of the first digital content;
   a content revising unit revising the first digital content in accordance with the interpreted revision permitting conditions;
   a second metadata generator receiving the identification information of the secondary author who has made a request to revise the first digital content from the content revising unit and the portion ratio information from the service provider system, and generating the second metadata written with the identification information of the secondary author and the portion ratio information;
   a metadata combiner combining the revised first digital content with the second metadata, and generating the second digital content having indicated with the portion ratio of the original author and the secondary author; and
   a portion judge requesting unit sending a portion judge request message in response to the request made by the secondary author to the portion judging unit, receiving the portion ratio information as a response message to the portion judge request message from the portion judge requesting unit, and, transmitting the portion ratio information to the second metadata generator.

13. A method of managing digital rights, the method comprising:
   receiving first digital content including first metadata written with identification information of original author, transferable rights and revision permitting conditions from a server;
   revising the first digital content in accordance with the revision permitting conditions indicated in the first metadata;
   generating second metadata by writing on the first metadata identification information of a secondary author who has made a request to revise the first digital content and portion ratio information indicating a portion ratio of a portion revised by the secondary author and a remaining original portion created by the original author in the first digital content; and
   generating second digital content having indicated with the portion ratio of the original author and the secondary author by combining the revised first digital content with the generated second metadata.

14. The method of claim 13, wherein the revising of first digital content revises the first digital content in accordance with revision count information, revision scope and revision type as the revision permitting conditions.

15. The method of claim 13, wherein the generating of second metadata further comprises:
   sending a portion judge request message with respect to the portion revised by the secondary author in response to a request made by the secondary author to the server;
   receiving the portion ratio information as a response message to the portion judge request message from the server; and
   combining the portion ratio information and the identification information of the secondary author with the first metadata.

* * * * *